United States Patent [19]

Watson, Jr.

[11] 4,054,239
[45] Oct. 18, 1977

[54] PROCESS FOR FABRICATING A HEAT EXCHANGER

[75] Inventor: James J. Watson, Jr., McMinnville, Tenn.

[73] Assignee: Carrier Corporation, Syracuse, N.Y.

[21] Appl. No.: 672,200

[22] Filed: Mar. 31, 1976

[51] Int. Cl.² .............................................. B21D 53/02
[52] U.S. Cl. ................................ 228/183; 29/157.3 C; 165/151; 432/5; 432/225
[58] Field of Search .................... 228/183; 432/1, 3, 4, 432/5, 6, 225; 29/157.3 C; 165/151

[56] References Cited

U.S. PATENT DOCUMENTS

| | | | |
|---|---|---|---|
| 2,160,633 | 5/1939 | Young | 432/225 |
| 3,760,481 | 9/1973 | Greever | 29/157.3 R |
| 3,945,554 | 3/1976 | Osterkorn et al. | 228/183 |

Primary Examiner—John J. Camby
Attorney, Agent, or Firm—J. Raymond Curtin

[57] ABSTRACT

An ultrasonic dip soldering process for bonding the tubular joints of a heat exchanger made up of tubular components joined together to form flow circuits within a fan coil. The joints are positioned adjacent to one of the tube sheets of the fan coil structure and the joints preheated by means of a remote heating process. The joints are then immersed in a molten bath of solder and treated to ultrasonic energy while in the bath.

9 Claims, 3 Drawing Figures

PROCESS FOR FABRICATING A HEAT EXCHANGER

BACKGROUND OF THE INVENTION

This invention relates to a process for bonding together the tubular components of a heat exchanger, the process being particularly well suited for bonding aluminum tubing.

For economic reasons, it has long been desirous in the art to form the tubular components of a fan coil type heat exchanger of aluminum based materials. However, the bonding of aluminum components has heretofore proven to be extremely difficult because of the rapid oxidation that takes place in the joint region during the bonding process. Recently, an ultrasonic dip soldering process was developed which essentially overcomes the oxidation problems. In the dip process, as disclosed by Greever in U.S. Pat. No. 3,760,481, the tubular joints of the heat exchanger are immersed in a molten bath of solder and the bath then treated with ultrasonic energy. The energy is transmitted through the bath into the joint regions to remove rapidly forming oxides created therein. The exchanger is then removed from the bath and the solder cooled in ambient air.

It has been found, however, that the heat exchanger body itself, being specifically designed as a highly efficient heat transfer structure, rapidly pulls heat out of the joint region during the soldering process. This, in turn, causes the solder to be prematurely solidified within the joint region before it can be treated with ultrasonic energy thus negating the advantages associated with the ultrasonic dip process.

SUMMARY OF THE INVENTION

It is therefore an object of the present invention to improve the ultrasonic dip soldering process.

It is a further object of the present invention to utilize a fan coil heat exchanger as a controlled heat sink when ultrasonically dip soldering the tubular joint connections of a heat exchanger.

These and other objects of the present invention are attained by a remote heating process for accurately preheating the joint region of a fan coil type heat exchanger prior to subjecting the joints to an ultrasonically treated bath of molten solder.

BRIEF DESCRIPTION OF THE DRAWINGS

For a better understanding of the present invention, as well as other objects and further features thereof, reference is had to the following detailed description of the invention to be read in conjunction with the accompanying drawings, wherein.

DESCRIPTION OF THE PREFERRED EMBODIMENT

Figure 1:
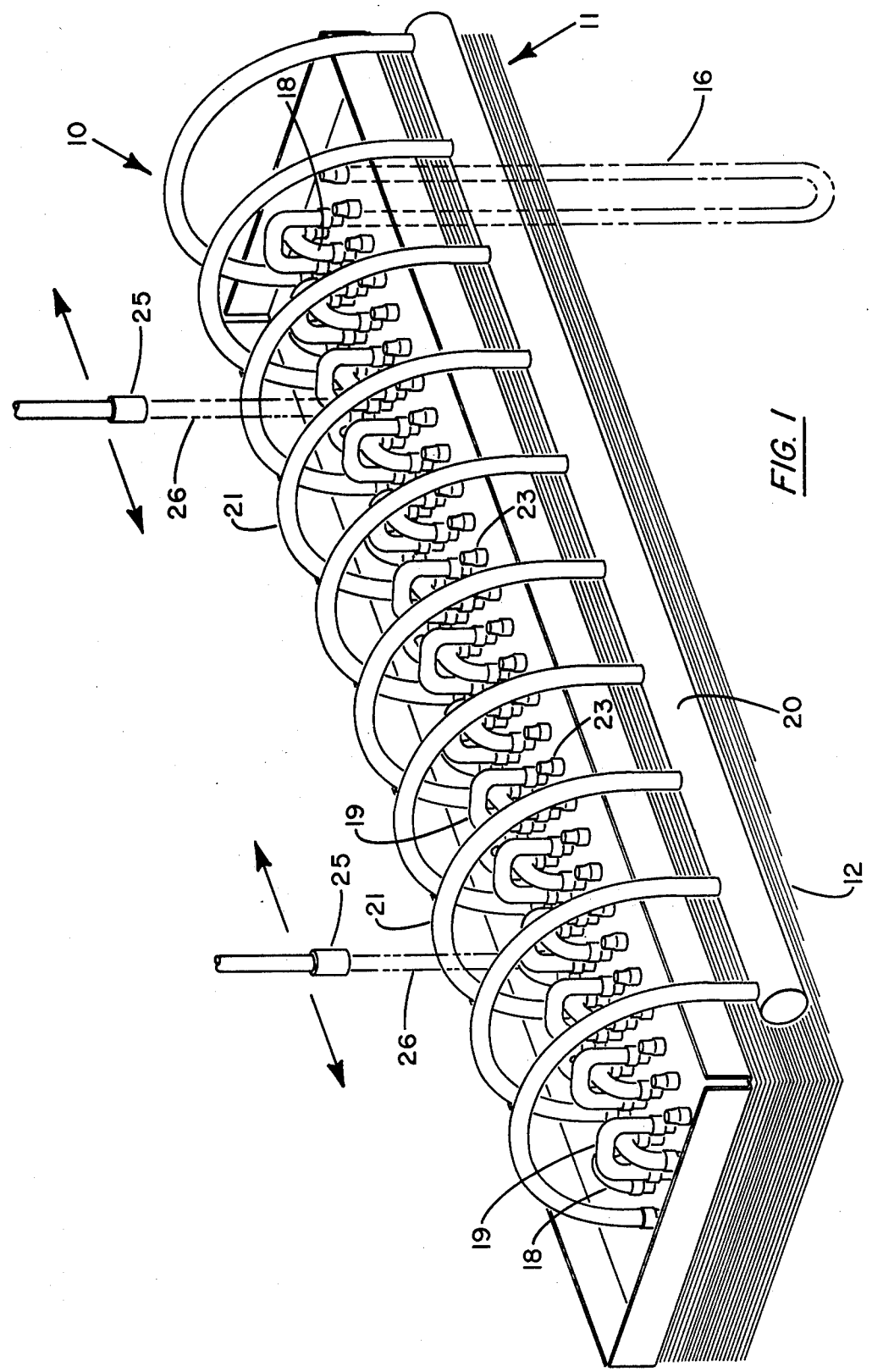
FIG. 1 is a fragmented perspective view of a heat exchanger coil having a number of parallel rows of tubes being interrelated by connectors so as to establish a plurality of complex flow circuits therein.
Figure 2:
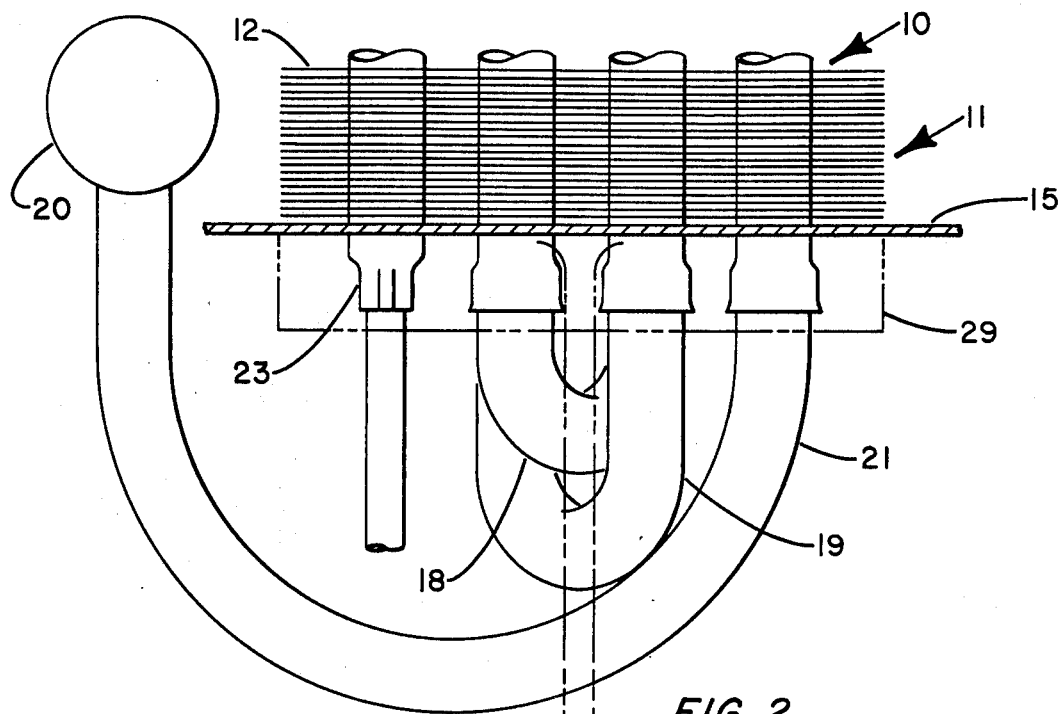
FIG. 2 is an end view of a complex coil, similar to that illustrated in FIG. 1, showing the establishment of a burning zone within the tube joint region utilizing the remote heating process of the present invention.

Referring first to FIGS. 1 and 2, there is illustrated a typical heat exchanger coil 10, having a number of complex flow circuits passing therethrough. The heat exchanger is formed of a fin package 11 having a plurality of parallel tube rows passing transversely through the structure. As best seen in FIG. 1, it is the general practice to form two adjacent tube rows from a single U-shaped tubular element 16. The U-shaped elements, generally called hairpins, are passed through the fin package and the open ends connected by return bends 18 and/or crossover tubes 19 to form flow circuits, each of which makes several passes through the evaporator assembly, thus enabling the working fluid to exchange a significant amount of energy with a heat transfer medium forced over the surface of the fin array.

In the refrigeration art, the exchanger is generally utilized to either discharge or acquire energy from air forced across the fins by a fan or the like. It is conventional to run the flow circuits across the full length of the assembly transverse to the direction of air flow with the circuits often times being interwoven together for maximum exchanger efficiency. Refrigerant is delivered into the exchanger from a series of distributors or the like (not shown) via inlet ports 23, passes through the various circuits and is then discharged into a central header 20 by means of header tubes 21.

The fin package 11 consists of a series of generally rectangular sheets 12 of thin gauge material, such as aluminum, having good heat transfer characteristics. The sheets are arranged in a stack-like configuration in spaced apart alignment between two relatively stiff end plates commonly referred to as tube sheets to provide a relatively rigid, free-standing structure. Tube receiving apertures are passed through the fin package, including the tube sheets, into which the hairpin elements 16 are inserted. A slight interference fit is provided between the fins and the hairpins whereby the tubes provide further structural strength to the assembly and the heat transfer properties of the coil are also enhanced.

In assembly, the free ends of the hairpins are brought out beyond one or both tube sheets, as for example tube sheet 15 shown in FIG. 2, and the free ends thereof belled out to receive in telescoped relationship therewith the various connector components which complete the various flow circuits. These connectors include, but are not limited to, return bends 18, crossover tubes 19, and header tubes 21, as illustrated in the drawings. The joint between the hairpins and the connectors is closed to create a high strength fluid-tight bond between the elements.

Typically, the bond is formed by introducing a filler metal, such as a brazing or soldering compound, into the bell region and creating a metallurgical bond between the elements by the application of heat to the joint region. Because of the economics involved, recent efforts have been directed toward fabricating all the tubular elements of a heat exchanger coil of aluminum. However, formation of reliable joints between aluminum tubes has proven to be difficult because most fluxes that are commercially available tend to create oxides within the joint region thus making the joints susceptible to corrosion. Two processes have been developed which eliminate the need to use a flux when forming an aluminum joint. These include an ultrasonic dip process, as disclosed by Greever in U.S. Pat. No. 3,760,481, and a forced fit process, as disclosed in U.S. Pat. No. 3,633,266. It should be noted that in both of these processes, accurately controlled heating or preheating of the joint region is necessary in order to create a reliable bond. As pointed out above, and as should be apparent from the present drawings, in the case of a complex coil as herein described, a relatively large number of connecting elements are brought together within a very limited area, making complete and regulated heating and/or preheating of the joints extremely difficult, particularly when employing conventional heat sources, such as radiant lamps or spear flame guns.

In practice, the tightly packed tubular components shadow or shield each other from conventional heat sources. The effect of shadowing is herein overcome by a heating process wherein energy is introduced into the joint region in the form of unignited, flammable gases using a remote nozzle or nozzles 25. The nozzle is trained at the surface of the tube sheet 15 which, as described above, is located adjacent to the bell joint region. A jet or stream 26 of flammable gas, such as natural gas, propane, or the like, is issued from the nozzle at a relatively high speed. The gas stream is maintained at a velocity high enough to prevent the gas from mixing ambient air as it moves from the nozzle to the tube sheet which, in effect, precludes the stream from being ignited prior to its impacting the tube sheet.

Upon striking the tube sheet, the gas flow is turned or flattened out to follow the planar contour of the sheet. Turning the gas stream causes the flow rate to be rapidly decelerated and the gas to be mixed with ambient air under turbulent conditions. As a consequence, a blanket of highly combustible material is established adjacent to the tube sheet; and blanket enveloping the tube joint region. In practice, the planar tube sheet performs a gas holding function quite similar to that observed when a jet of water is impinged against a pane of flat glass. Rather than rebounding away from the planar surface at impact, the fluid moves out along the planar surface in close proximity therewith to form a finite zone at or about the planar surface.

Once established, the blanket of gas in the joint region is ignited to form a burning zone 29 of finite geometry which will continue to burn as long as the high velocity jet of gas is directed at the tube sheet. It has been found that the geometry and the temperature of the burning zone can be closely regulated by controlling either the jet impact angle, the distance of travel between the nozzle and the tube sheet, the jet velocity and/or the quantity of gas directed into the burning zone. In operation, it is preferable to maintain the height of the burning zone, in reference to the plane of the tube sheet, just above the tubular joints thereby minimizing the possibility of causing thermal damage to adjacent coil components. The height of the burning zone can be most conveniently regulated by controlling the velocity of the gas jet directed at the tube sheet.

It should be further noted that the gas stream directed at the tube sheet has the ability to conveniently flow about or around the tubular connectors without disturbing the operation of the heating process. The characteristic of most gases coupled with the generally streamline configuration of the tubular components serves to minimize drag and thus permits the gas to flow relatively freely into the burning zone. In operation, a series of nozzles, such as the nozzles shown in FIG. 1, can be moved back and forth over the joint region to establish and maintain an elongated burning zone encompassing the entire joint region of the heat exchanger.

Figure 3:
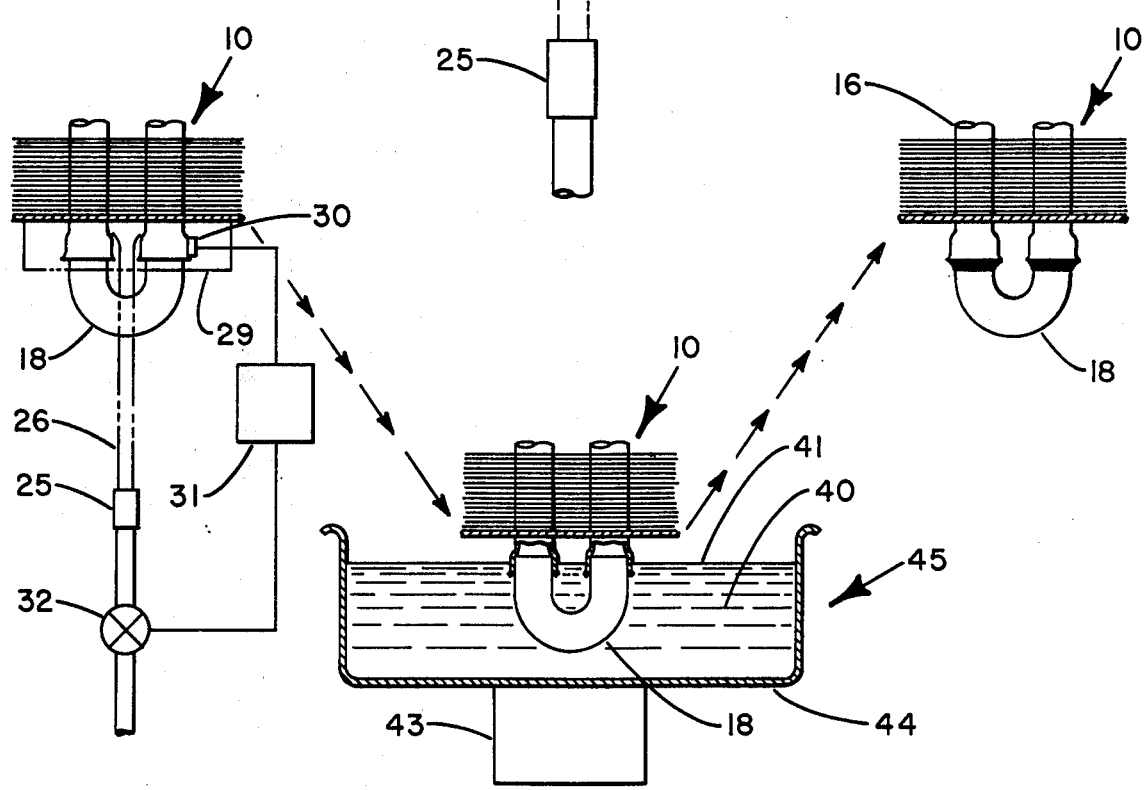
FIG. 3 is a diagrammatic goal illustration of a process for joining the tubular connections of a coil assembly utilizing the remote heating process of the present invention.

Referring now to FIG. 3, there is illustrated an ultrasonic dip process for soldering connector joints which employs the teachings of the present invention. As disclosed in the previously noted Greever patent, the soldering process basically involves immersing the joints into a molten bath of solder and treating the bath to ultrasonic energy. Because the fan coil is designed as a good heat exchanger, drainage of heat out of the joint area during this soldering process can take place at a relatively rapid rate. In order to establish a truly reliable joint, it has been found advantageous to preheat the coil prior to dipping it into the solder bath. By preheating the coil, the coil structure will act as a controlled heat sink when the joints are immersed within the ultrasonic bath thus insuring that the temperature in the joint region does not fall below the critical soldering temperature.

As illustrated in FIG. 3, the remote heating process previously described is utilized to accomplish the preheating step. As seen, the nozzle 25 is directed at the tube sheet 15 of a heat exchanger coil 10 in process. As a result, a burning zone 29 is established about the joint region. To control the preheating step, a thermal probe 30 is placed against the bell joint within the burning zone. The thermal coupling is arranged to send a temperature indicative signal to a regulator 31 which controls the flow of gas to a nozzle via automatic control valve 32.

When the desired preheating temperature is reached, the flow of gas is terminated and the probe removed from the bell joint region. The heat exchanger coil is then rapidly moved into a molten solder bath 40 with the bell joints being immersed below the surface 41 thereof to a predetermined, controlled depth. The immersed joints are allowed to remain in the bath for a dwell period so that thermal equilibrium is reached. A transducer 43, located along the bottom wall 44 of the tank 45, is actuated which subjects the solder to ultrasonic energy which, in turn, is imparted to the joint region. This energy serves to remove unwanted oxides from the bell joint region. Upon completion of the soldering step, the fan coil is removed from the bath and the now bonded joints allowed to air cool and solidify.

While this invention has been described with reference to the structure herein disclosed, it is not confined to the details as set forth, and this application is intended to cover any modifications or changes as may come within the scope of the following claims.

What is claimed is:

1. In the fabrication of a heat exchanger wherein a number of tubular components are joined together to form flow circuits within a fan coil, the process of joining the components comprising providing telescoped socket joints between the tubular components positioned adjacent to at least one tube sheet of the fan coil, directing a high speed jet of flammable gas at the tube sheet whereby the jet is redirected by the tube sheet to form a blanket of gas about the outside of the tubular joints, maintaining the speed of the jet traveling between its source and the tube sheet at a velocity sufficient to prevent the gas from mixing with ambient air and thus being ignited, igniting the blanket formed at the tube sheet to heat the joints within the blanket region to a predetermined temperature, immersing the preheated joints in a bath of liquid solder, and exposing the bath to ultrasonic energy while the joints are immersed therein.

2. The method of claim 1 including the step of moving the source of the gas stream in regard to the tube sheet so as to establish an extended blanket of gas within the tubular joint region.

3. The process of claim 1 wherein a plurality of high speed jets are directed at the tube sheet.

4. The process of claim 1 wherein the joints are removed from the bath of molten solder and permitted to air cool.

5. The process of claim 1 wherein the temperature and geometry of the blanket is regulated by controlling the quantity of gas directed at the tube sheet.

6. The process of claim 1 wherein the temperature and geometry of the blanket is regulated by controlling the impact angle of the jet against the tube sheet.

7. The process of claim 1 whereby the temperature and geometry of the blanket is controlled by regulating the distance traveled by the jet between its source and the tube sheet.

8. The process of claim 1 wherein the height of the blanket above the tube sheet is controlled by regulating the velocity of the gas stream directed at the tube sheet.

9. The method of claim 1 further including the steps of sensing the temperature of the tubular joints within the blanket region, and regulating the flow of gas into the blanket in response to the temperature sensed.

* * * * *